United States Patent [19]
Nahar et al.

[11] Patent Number: 5,940,388
[45] Date of Patent: *Aug. 17, 1999

[54] INTERFACING A D4 CHANNEL BANK TO A TR-8 INTERFACE MODULE VIA A-LINK

[75] Inventors: Jinen K. Nahar, Richardson; Janet Li-Chang Lin; Mangalore S. Babu, both of Garland, all of Tex.

[73] Assignee: Ericsson, Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/667,113

[22] Filed: Jun. 20, 1996

[51] Int. Cl.$^6$ ...................................... H04Q 11/04
[52] U.S. Cl. .......................... 370/359; 370/463; 370/466; 370/510; 370/524
[58] Field of Search ..................................... 370/465, 466, 370/467, 522, 523, 503, 509, 510, 359, 420, 463, 524, 464; 379/333, 350

[56] References Cited

U.S. PATENT DOCUMENTS

| | | | |
|---|---|---|---|
| 4,768,192 | 8/1988 | Pattavina et al. | 370/466 |
| 4,852,157 | 7/1989 | Tyrrell | 370/524 |
| 5,144,625 | 9/1992 | Cain et al. | 370/522 |
| 5,369,696 | 11/1994 | Krauss et al. | |
| 5,383,180 | 1/1995 | Kartalopoulos | 370/377 |
| 5,455,824 | 10/1995 | Okuyama et al. | |
| 5,528,579 | 6/1996 | Wadman et al. | 370/522 |

FOREIGN PATENT DOCUMENTS 2097224  10/1982  United Kingdom .

WO 9629841  9/1996  WIPO .

OTHER PUBLICATIONS

J. Chernak and J.J. Lang, D4 Digital Channel Bank Family: Overview, The Bell System Technical Journal, vol. 61, No. 9, Nov. 1982, pp. 2607–2625.
C.R. Crue, W.B. Gaunt, Jr., J.H. Green, J.E. Landry, and D.A. Spires, The Channel Bank, The Bell System Technical Journal, vol. 61, No. 9,, Nov. 1982, pp. 2611–2625.
C.R. Crue, et al., "The Channel Bank," *The Bell System Technical Journal*, 61 (1982), 2611–2661.
Y–S. Cho, et al., "The SLC –96 System," *The Bell System Technical Journal*, 61 (1982), 2677–2703.
Arnold A.W., et al., "DMS–100 Business Services and Networking," *International Switching Symposium*, No. 34 (Sep. 1981), pp. 1–7.

*Primary Examiner*—Chau Nguyen
*Attorney, Agent, or Firm*—Jenkens & Gilchrist

[57] ABSTRACT

A TR-8 compatible Remote Terminal (RT) with 96 subscriber line capacity is partially or wholly replaced with one or more D4 channel banks each comprising 24 subscriber line capacity without changing the TR-8 interface module within the servicing telecommunications exchange. The D4 channel bank is connected via a T-1 digital link to any one of the A, B, C, and D links within the TR-8 interface module. A-B bit pattern data and time slot assignments communicated between the D4 channel bank and the TR-8 interface module are converted to be compatible with each other. If a D4 channel bank is connected to the TR-8 interface module via an A-link, the maintenance data are further ignored. Connecting a D4 channel bank to a TR-8 interface module allows small telecommunications service providers to more economically provide line access to sparsely populated customer sites.

24 Claims, 6 Drawing Sheets

INTERFACING A D4 CHANNEL BANK TO A TR-8 INTERFACE MODULE VIA A-LINK

CROSS REFERENCE TO RELATED APPLICATION

This application is related to U.S. Application for Patent Ser. No. 08/612,768 filed Mar. 8, 1996, now U.S. Pat. No. 5,751,717, entitled "A Subscriber Line Interface In A Telecommunications Exchange."

BACKGROUND OF THE INVENTION

1. Technical Field of the Invention

The present invention relates to a subscriber line interface in a telecommunications exchange and, in particular, to the provision of subscriber line access to remote subscribers.

2. Description of Related Art

During the initial introduction of telecommunications exchanges, all telecommunications subscribers were connected with their servicing telecommunications exchanges via individual copper wire lines. Each individual conversation would accordingly be carried on a separate pair of wires or set of wires. However, due to the rapid increase in the number of telecommunications subscribers, the number of telecommunications lines connecting to each telecommunications exchange became numerous and unmanageable. This exclusive connection configuration between a single subscriber and its servicing telecommunications exchange was also wasteful since no subscriber used his telecommunications line continuously.

The foregoing problems and concerns were alleviated to some degree by the advent of Pulse Code Modulation (PCM) technology. Using the PCM technology, a multiplexing device, such as a D4 channel bank developed by Bell Labs, was introduced to convert the analog signals of 24 subscriber lines into digital signals for communication over a single communications link. On the other end of the communications link, another D4 channel bank was used to reconvert the digital signals to analog signals for input to the servicing telecommunications exchange. Such an implementation is also known as Digital Loop Carrier (DLC) technology. As a result, a pair of D4 channel banks could handle 24 subscriber lines via a single digital link.

With the successful implementation of the PCM technology, other types of multiplexers known as Subscriber Loop Carriers were introduced to handle greater subscriber line capacity. For example, one of the most prevalently used multiplexers was the Subscriber Loop Carrier (SLC) 96 system developed by AT&T. After the introduction, SLC-96 rapidly became the market standard for implementing the DLC technology.

A SLC-96 serves 96 subscriber lines using only four communications links, with each communication link servicing 24 subscriber lines. On the subscriber side, a SLC-96 remote terminal (RT) serves up to 96 subscribers. On the telecommunications exchange side of the communications links, a Central Office Terminal (COT) is used to connect to the SLC-96 RT and to reconvert the digital signals back to analog signals. The converted data are then input into the servicing telecommunications exchange. Such a connection arrangement using a COT and RT is commonly referred to as an Universal Digital Loop Carrier (UDLC) since the connection between the COT and the RT is independent of any telecommunications exchange. The use of SLC-96 became very dominant, especially in North America, because even the smallest neighborhood almost always had more than 96 subscribers or homes which could be serviced by a single SLC-96 RT device. As a result, each SLC-96 RT could be utilized to its maximum capacity while only requiring four communications links.

Because the above COT equipment for the telecommunications exchange side of the SLC-96 connection is expensive, the Bell Operating Companies (Bellcore) mandated AT&T to standardize the interface part of the UDLC connection to enable each telecommunications exchange to directly implement its own interface module. Such implementation within each telecommunications exchange would enable direct interface with a SLC-96 RT without connecting through an expensive piece of COT equipment. This interface standard became known as Bellcore's TR-TSY-000008 standard, or TR-8 standard, and is incorporated by reference herein. Consequently, each telecommunications exchange was equipped with an interface module (hereinafter referred to as a TR-8 interface module) to connect the digital communications links directly from a TR-8 compliant SLC-96 RT (also known as a TR-8 compatible RT, collectively referred to as a TR-8 RT hereinafter). An example of such an interface module is an Extension Switch Module (ESM) manufactured by Telefonaketiebolaget LM Ericsson (publ).

With the de-monopolization of the telecommunications industry, a number of different telephone service companies now provide telephone service within the same geographic area. Small telephone service providers became attractive especially for small businesses and building owners because of their price competitiveness. However, due to the size and business environment of their customers, it became apparent that the service providers did not need to provide full 96 subscriber line capacity to small businesses and buildings. For the most part, 24 subscriber line capacity sufficed. Accordingly, expensive TR-8 RT equipment installed by these service providers on customer premises was underutilized. Yet, the TR-8 interface standard specifies that each telecommunications exchange contain an interface module providing for at least one 96 channel RT connection, thus implying that each customer premises be equipped with TR-8 RT compatible equipment at an unacceptable cost of thousands of dollars.

Accordingly, it would be advantageous to provide a system to more economically provide telecommunications line access to remote subscribers without modifying the existing TR-8 interface modules within telecommunications exchanges.

SUMMARY OF THE INVENTION

The system of the present invention economically provides telecommunications line service to a plurality of telecommunications subscribers using channel bank devices. Channel bank devices interface with TR-8 interface modules within servicing telecommunications exchanges. By utilizing channel bank devices, 24 line capacity instead of 96 line capacity is used to economically provide telecommunications service to each remote subscriber location. Furthermore, a single TR-8 interface module within a telecommunications exchange can service up to four different geographic areas. Moreover, a single TR-8 interface module within a telecommunications exchange can simultaneously service up to four channel banks.

In one aspect, the present invention includes a method and apparatus for providing telecommunications line service to a plurality of subscribers by utilizing a channel bank interfacing with a TR-8 interface module within a servicing telecommunications exchange.

In another aspect, the present invention includes a method for connecting multiple subscribers to a channel bank, digitizing analog data received from the subscribers, transmitting the digitized data over a T-1 communication link to a TR-8 interface module within a telecommunications exchange, and providing telecommunications service in response to the received data.

In yet another aspect, the present invention discloses a method and apparatus for interfacing a channel bank with an A-link Pulse Code Modulation (PCM) interface part of a TR-8 interface module.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
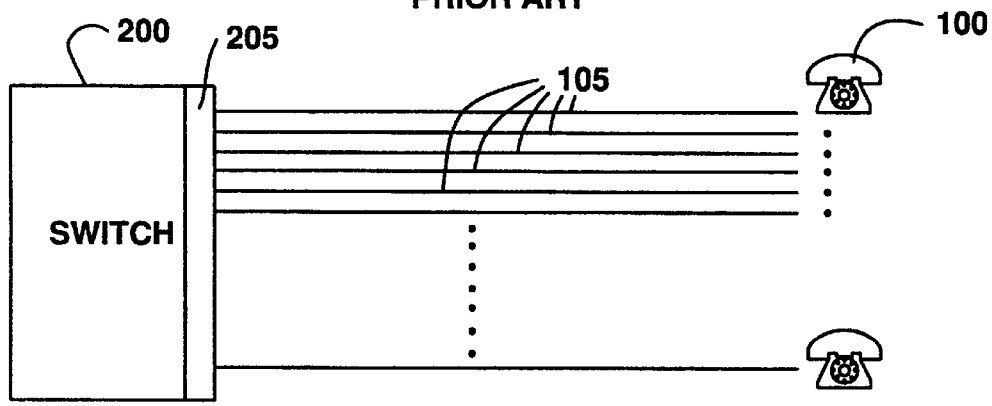
FIG. 1 is a diagram illustrating multiple telecommunications subscribers connecting directly to a servicing telecommunications exchange.

FIG. 1 is a diagram illustrating multiple telecommunications subscribers 100 connecting directly to their servicing telecommunications exchange 200. During the initial development of telecommunications exchanges, all telecommunications subscribers were directly connected by individual copper wire lines 105 to their servicing telecommunications exchange 200 via a line interface (LI) module 205. As the number of subscribers 100 increased rapidly, the number of copper wire lines 105 connected to each telecommunications exchange 200 became unmanageable. Furthermore, installing individual direct lines for each customer became too expensive.

This problem was somewhat alleviated by the advent of Pulse Code Modulation (PCM) technology. PCM is an analog-to-digital conversion technique used to convert voice analog data to digital data for transmission in a multiplexed voice and data stream over a T-1 or other digital circuit. Typically, there are 24 subscriber circuits or channels within a single digital link. Each channel samples the voice, converts it to an eight-bit digital word, and transmits it over a line interspersed with digital signals from 23 other channels. Therefore, by utilizing the PCM technology, 24 channels communicate over a single digital line.

Figure 2:
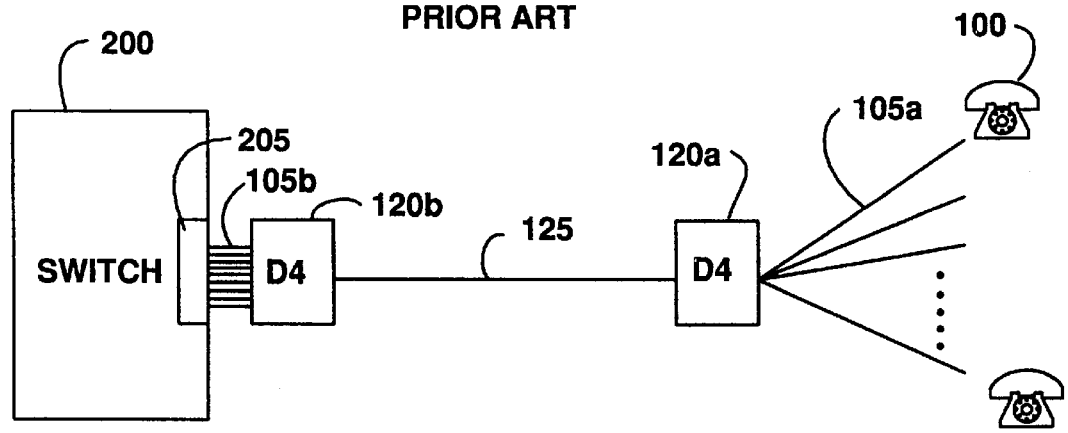
FIG. 2 is a diagram illustrating a pair of D4 channel banks connecting multiple telecommunications subscribers to a servicing telecommunications exchange via a single digital communications link.

FIG. 2 is a diagram illustrating a pair of D4 channel banks 120 connecting multiple telecommunications subscribers 100 with their servicing telecommunications exchange 200 via a single digital link 125. Up to 24 subscribers 100 are connected to a channel bank 120 such as a D4 Digital Termination System (DTS) manufactured by AT&T or other D4 compatible devices 120a (collectively referred to as a D4 channel bank or D4 hereinafter) via conventional lines 105a. The D4 120a digitizes analog signals received from each subscriber, intersperses the digitized signals, and transmits them over a T-1 digital line 125. Another D4 120b connected to the servicing telecommunications exchange 200 receives the digitized signals, re-converts them back to analog signals, and inputs them to the LI module 205 via conventional lines 105b. Accordingly, by utilizing a pair of D4 channel banks, 24 subscribers are able to communicate with a telecommunications exchange 200 via a single digital communications link 125.

Figure 3:
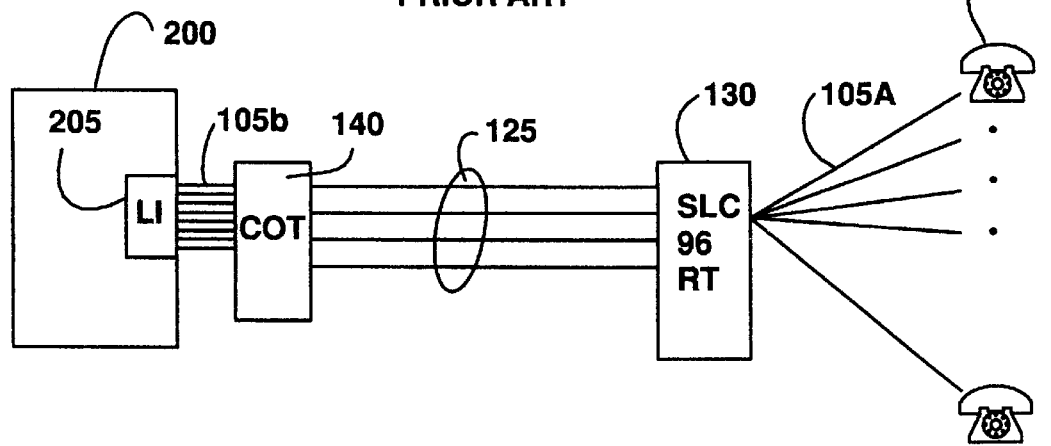
FIG. 3 is a diagram illustrating a Universal Digital Loop Carrier (UDLC) connecting multiple telecommunications subscribers to a servicing telecommunications exchange.

With the successful implementation of the above PCM technology, AT&T further introduced a Subscriber Loop Carrier (SLC)-96 multiplexer system. The SLC-96 system enables 96 subscribers to communicate with a servicing telecommunications exchange via four digital links, each digital link individually handling 24 subscriber channels. Accordingly, FIG. 3 is a diagram illustrating a SLC-96 remote terminal (RT) 130 connecting up to 96 telecommunications subscribers 100 to their servicing telecommunications exchange 200. The 96 subscribers are connected to the SLC-96 RT or SLC-96 compatible RT 130 (collectively referred to as SLC-96 RT hereinafter) via conventional lines 105a. The SLC-96 RT 130 again digitizes analog signals received from each subscriber 100 and transmits them over four T-1 links 125. A Central Office Terminal (COT) 140 connected to other end of the above four T-1 lines 125 converts the received digitized signals to analog signals, and inputs them to the appropriate line interface (LI) module 205 via conventional lines 105b. Accordingly, the COT 140 serves the telecommunications switch side and the SLC-96 RT serves the subscriber line side of the connection. The above configuration connecting a SLC-96 RT with a COT is known as the Universal Digital Loop Carrier (UDLC) system because the configuration is independent of any telecommunications switch.

Even the smallest neighborhoods have more than 96 telecommunications subscribers and, as a result, grouping 96 subscribers within a specific geographical area and connecting them to a single SLC-96 RT is not a problem. As a result, the SLC-96 system rapidly became the standard in the telecommunications industry.

Because equipment for the UDLC system is expensive, the Bell Operating Companies (Bellcore) mandated AT&T to standardize and disclose the SLC-96 RT 130 and COT 140 connection interface. The standardized interface resulting from the above mandate became known as Bellcore's TR-TSY-000008, or TR-8, entitled "Digital Interface Between the SLC 96 Digital Loop Carrier System and a Local Digital Switch." Such a standardized interface allowed each telecommunications exchange vendor to directly implement the multiplexer in the telecommunications exchanges obviating the need to purchase the additional COT from AT&T for each SLC-96 connection.

Figure 4:
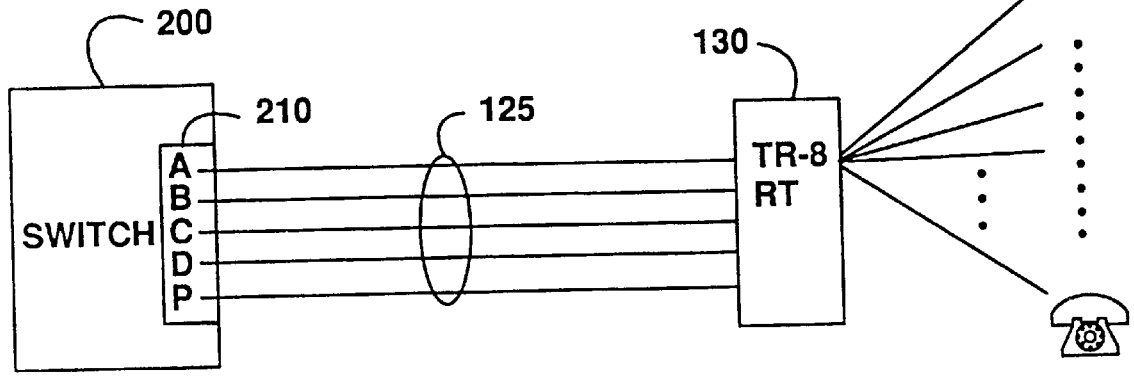
FIG. 4 is a diagram illustrating a TR-8 interface module within a telecommunications exchange interfacing with a TR-8 Remote Terminal (RT)

Accordingly, FIG. 4 is a diagram illustrating a TR-8 compliant interface module (hereinafter referred to as a TR-8 interface module) 210 within a telecommunications exchange 200 interfacing with a TR-8 compliant RT (hereinafter referred to as a TR-8 RT) 130 via five T-1 communications links 125. Aside from the four communications links comprising A, B, C, and D links, an additional protection (P) link is added to replace an A-D communication link if any one of them should fail. By connecting the TR-8 RT 130 via five communications links 125, the telecommunications exchange 200 can provide telecommunications service to 96 subscribers much more economically.

Due to the de-monopolization of the telecommunications industry, a number of different telephone service providers are offering to provide telecommunications line service to the same subscribers normally serviced by the traditional telephone operating company. Due to their competitive pricing and flexible service, small telephone service providers are becoming attractive to small businesses and building owners. However, due to the customer size and business environment, it became apparent that most of the small businesses and buildings did not require the full 96 subscriber line capacity provided by a TR-8 RT. For the most part, a 24 line capacity sufficed. For large telephone companies, they could always group additional subscribers from the same building or geographical area to fill up the 96 subscriber capacity. However, for the new individual telephone service providers, unless they can convince neighboring business or building owners to subscribe to their service, grouping additional subscribers from the same building or geographical area is not always possible. As a result, installing a TR-8 RT became wasteful and expensive. Accordingly, it would be advantageous to provide a more economical way to service a lesser number of subscriber lines located remotely from the servicing telecommunications switch.

Figure 5:
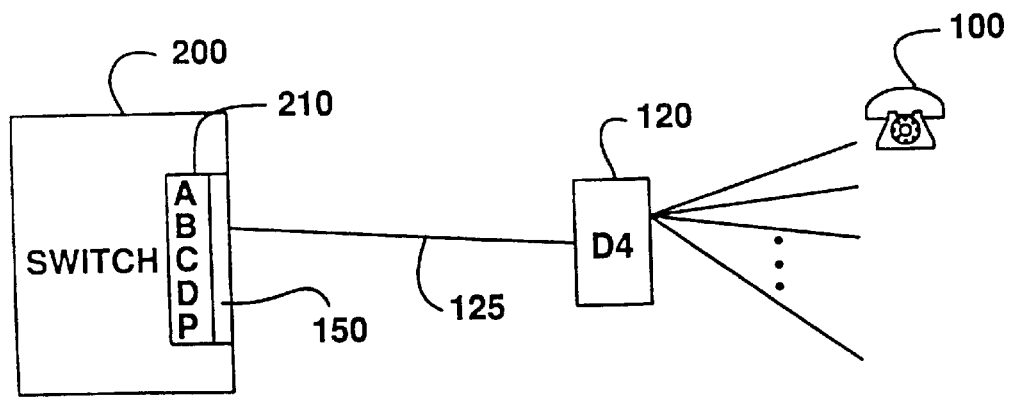
FIG. 5 is a diagram illustrating a TR-8 interface module within a telecommunications exchange interfacing with a D4 channel bank.

FIG. 5 is a diagram illustrating a D4 channel bank 120 interfacing with a TR-8 interface module 210 within a telecommunications exchange 200 in accordance with the teachings of the present invention. The D4 channel bank 120 communicates over the same T-1 digital line 125 utilizing the same PCM technology used by the TR-8 RT 130. By substituting the TR-8 RT with the D4 channel bank 120, a less expensive device can be installed on a customer's premises to service up to 24 subscriber lines. For small telecommunications service providers, such a configuration is much more economical and efficient. If that particular customer's capacity increases to more than 24 subscribers 100, additional D4s can easily be added to handle the additional line capacity. As mentioned previously, the TR-8 interface module 210 with the telecommunications switch 200 comprises the A, B, C, or D communications links with one P link for protection. The D4 channel bank 120 has the flexibility of connecting to any one of the above A, B, C, and D communications links.

When signals are received by the telecommunications switch 200, the signals are first intercepted by a conversion module 150. The conversion module 150 resolves certain inconsistencies existing between the D4 signaling standard and the TR-8 RT signaling standard. One such inconsistency existing between the two standards is the incompatible A-B bit patterns. Another is the incompatible time slot assignments.

Each subscriber action generated by a subscriber terminal or telecommunications switch is represented by two-bit data known as the A-B bit pattern. As an illustration, whenever a subscriber terminal 100 goes off-hook, a specific A-B bit pattern is generated to inform the servicing telecommunications switch that the subscriber terminal has gone off-hook. Likewise, if the servicing telecommunications switch 200 needs to generate a ring tone to a particular subscriber terminal, a specific A-B bit pattern is generated to instruct the TR-8 RT or D4 channel bank to generate the desired tone. However, A-B bit patterns utilized by the D4 channel bank are different from the ones utilized by the TR-8 RT. Consequently, by connecting the D4 channel bank 120 with the TR-8 interface module 210, A-B bit patterns transmitted by the D4 channel bank 120 will not be recognized properly by the TR-8 interface module 210. Accordingly, whenever the D4 channel bank 120 is connected to the TR-8 interface module 210, the conversion module 150 references a conversion table (not shown in FIG. 5) and converts the A-B bit pattern data communicated between the TR-8 interface module and the D4 channel bank to be compatible with each other. Table 1 shows an exemplary conversion table for translating A-B bit pattern data representing subscriber line status communicated between the D4 channel bank 120 and the TR-8 interface module 210:

TABLE 1

| Subscriber | TR-8 standard | | D4 standard | |
|---|---|---|---|---|
| Line status | A | B | A | B |
| On-Hook | 0 | 0 | 0 | 1 |
| Off-Hook | 1 | 0 | 1 | 1 |

Furthermore, as described previously, each channel representing a specific subscriber line is assigned to one of the twenty-four time slots afforded by the PCM technology. However, the D-4 channel bank 120 utilizes a D3/D4 (also called sequential) channel scheme whereas the TR-8 RT 130 utilizes a D1D channel scheme. Because the D3/D4 scheme assigns channels differently than the D1D scheme, signals received from a channel assigned by the D4 channel bank 120 is incompatible with channels expected by the TR-8 interface module 210. The time slot inconsistency is better illustrated by referring to Table 2 below:

TABLE 2

| Time Slot | D3/D4 channel scheme | D1D channel scheme |
|---|---|---|
| 1 | 1 | 1 |
| 2 | 2 | 13 |
| 3 | 3 | 2 |
| 4 | 4 | 14 |
| 5 | 5 | 3 |
| 6 | 6 | 15 |
| 7 | 7 | 4 |
| 8 | 8 | 16 |
| 9 | 9 | 5 |
| 10 | 10 | 17 |
| 11 | 11 | 6 |
| 12 | 12 | 18 |
| 13 | 13 | 7 |
| 14 | 14 | 19 |
| 15 | 15 | 8 |
| 16 | 16 | 20 |
| 17 | 17 | 9 |
| 18 | 18 | 21 |
| 19 | 19 | 10 |
| 20 | 20 | 22 |

TABLE 2-continued

| Time Slot | D3/D4 channel scheme | D1D channel scheme |
| --- | --- | --- |
| 21 | 21 | 11 |
| 22 | 22 | 23 |
| 23 | 23 | 12 |
| 24 | 24 | 24 |

As illustrated above, if the D4 channel bank is utilized, time slot 2 is used to connect with channel 2. On the other hand, if the TR-8 RT is used, time slot 2 is used instead to connect with channel 13. Because of this inconsistency in the channel assignment, improper communication would occur between the D4 channel bank and the TR-8 interface module.

Accordingly, the conversion module 150 further coverts the time slots communicated between the D4 channel bank and the TR-8 interface module to be compatible with each other by using the pseudo code conversion algorithms illustrated below.

Figure 6:
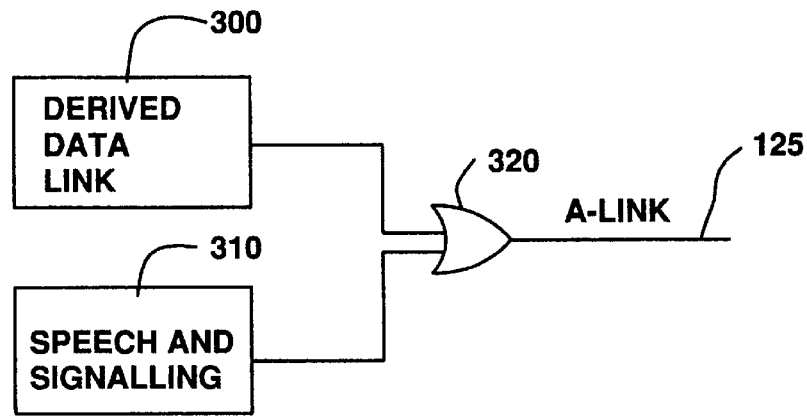
FIG. 6 is a logical diagram illustrating derived data link data and speech and signaling data being communicated over the A-link.

Conversion from D1D to D4:
If D1D_Time_Slot=Odd then
D4_Time_Slot=D1D_Time_Slot/2+1
Else
D4_Time_Slot=D1D_Time_Slot/2+12
EndIf
Conversion from D4 to D1D:
If D4_Time_Slot<13 then
D1D_Time_Slot=(2*D4_Time_Slot)−1
Else
D1D_Time_Slot=(D4_Time_Slot−12)*2
EndIf Furthermore, in case the D4 channel bank 120 is connected to the A link, additional procedures must be performed by the conversion module. Now referring to FIG. 6, there is shown a logical diagram illustrating the transmission of both derived data 300 and speech data 310 by an OR gate 320 over the A-link 125. Instead of merely communicating speech data over the PCM A-link 125, the TR-8 interface module further communicates other information including alarm data, maintenance data, and re-synchronization data. However, some of these data are not expected and transmitted by a D4 channel bank. Accordingly, in order to connect a D4 channel bank to the TR-8 interface module via an A-link, the conversion module must filter some of the unrecognized data from and to the connected D4 channel bank.

Figure 7:
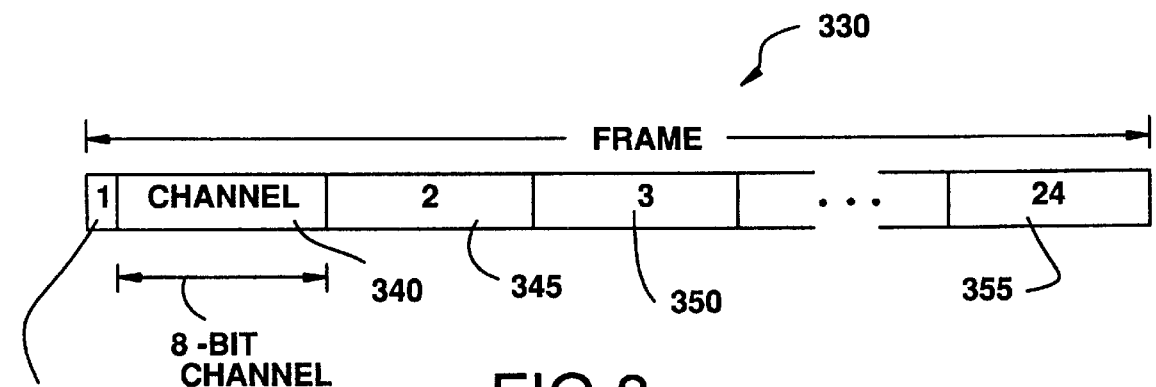
FIG. 7 is a logical diagram illustrating the data structure of a frame.

Reference is now made to FIG. 7 illustrating a data structure of a frame 330. Each frame 330 being communicated over the PCM link per each cycle includes 193 bits. Since each link serves up to 24 subscribers as described above, 8 bits constituting a channel 340–355 are accordingly allocated per subscriber. As an illustration, the first channel 340 is allocated to subscriber 1, the second channel 345 is allocated to subscriber 2, the third channel 350 is allocated to subscriber 3, and eventually, the twenty fourth channel 355 is allocated to subscriber 24. Even after allocating eight bits to each subscriber, the above configuration still leaves one (1) bit remaining out of the 193 bits available within a frame. This remaining very first bit 335 is utilized by the TR-8 interface module to communicate re-synchronization and derived data link data over the A-link.

Figure 8:
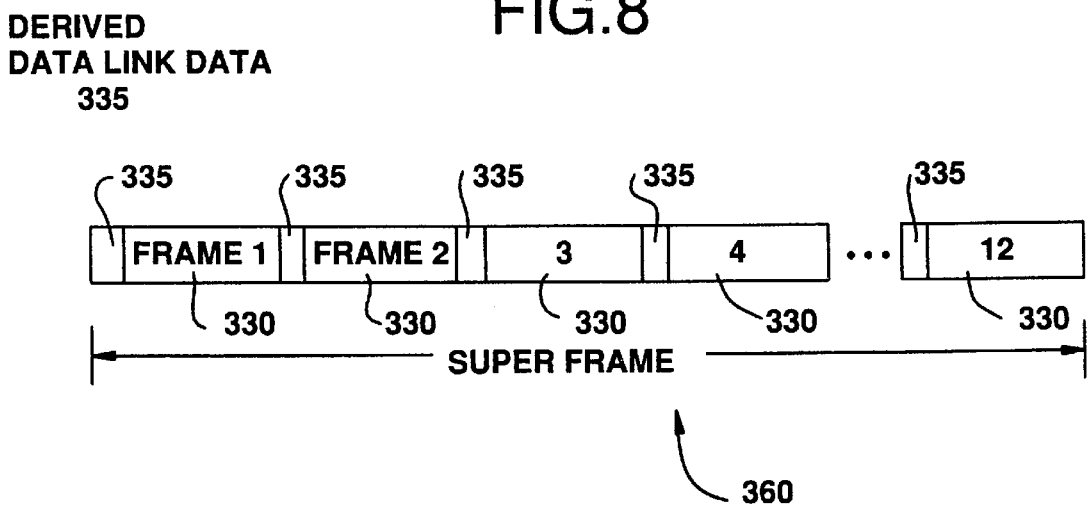
FIG. 8 is a logical diagram illustrating the data structure of a super-frame.

Reference is now made to FIG. 8 illustrating the data structure of a super frame 360. Each super frame includes 12 frames 330. As twelve consecutive frames are received by the TR-8 interface module, the very first bit of each of the twelve frames 330 within the super frame 360 are sequentially collected to form twelve bit re-synchronization and derived-data-link data.

Figure 9:
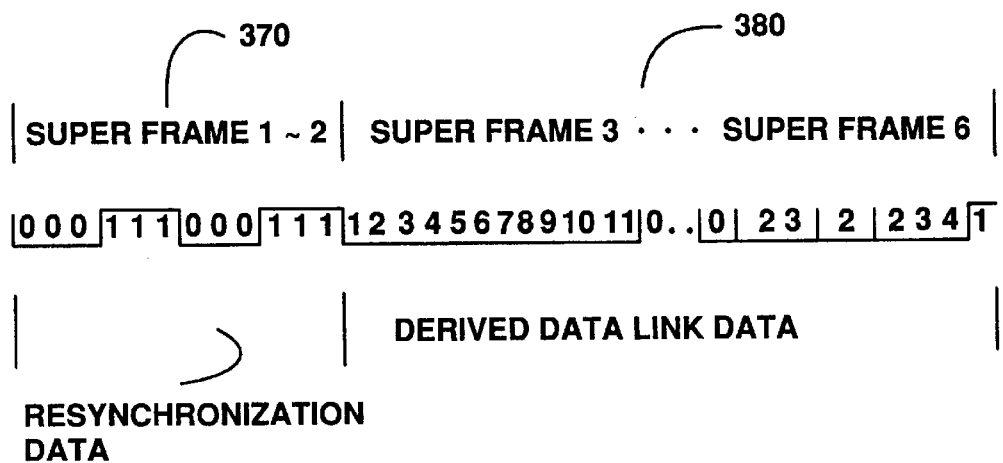
FIG. 9 is a logical diagram illustrating the data structure of a full set of re-synchronization and derived data link data.

The twelve bit re-synchronization and derived-data-link data collected from six consecutive super frames are then used to form a full set of re-synchronization and derived data link data as illustrated by FIG. 9. Reference is now made to FIG. 9 illustrating the data structure of a full set of re-synchronization and data-link-data. The first two super frames 370 comprising the first twenty-four bits (only every other bit is shown in FIG. 9) are for communicating re-synchronization data between the TR-8 interface module and the SLC-96 RT. The next four super frames 380 comprising the next forty-eight bits are for communicating derived data link data between the TR-8 interface module and the SLC-96 RT.

Within the last four super frames, the D4 channel bank does not transmit and expect the derived data link data. Instead, the D4 channel bank transmits and expects the same re-synchronization data that were transmitted by the first two super frames. As a result, in order to connect a D4 channel bank with the TR-8 interface module via an A-link, the conversion module within the TR-8 interface module must discard and not expect the derived data link data over the PCM link. Furthermore, the TR-8 interface module must continue to transmit the previously transmitted re-synchronization data over the last four super frames.

Figure 10:
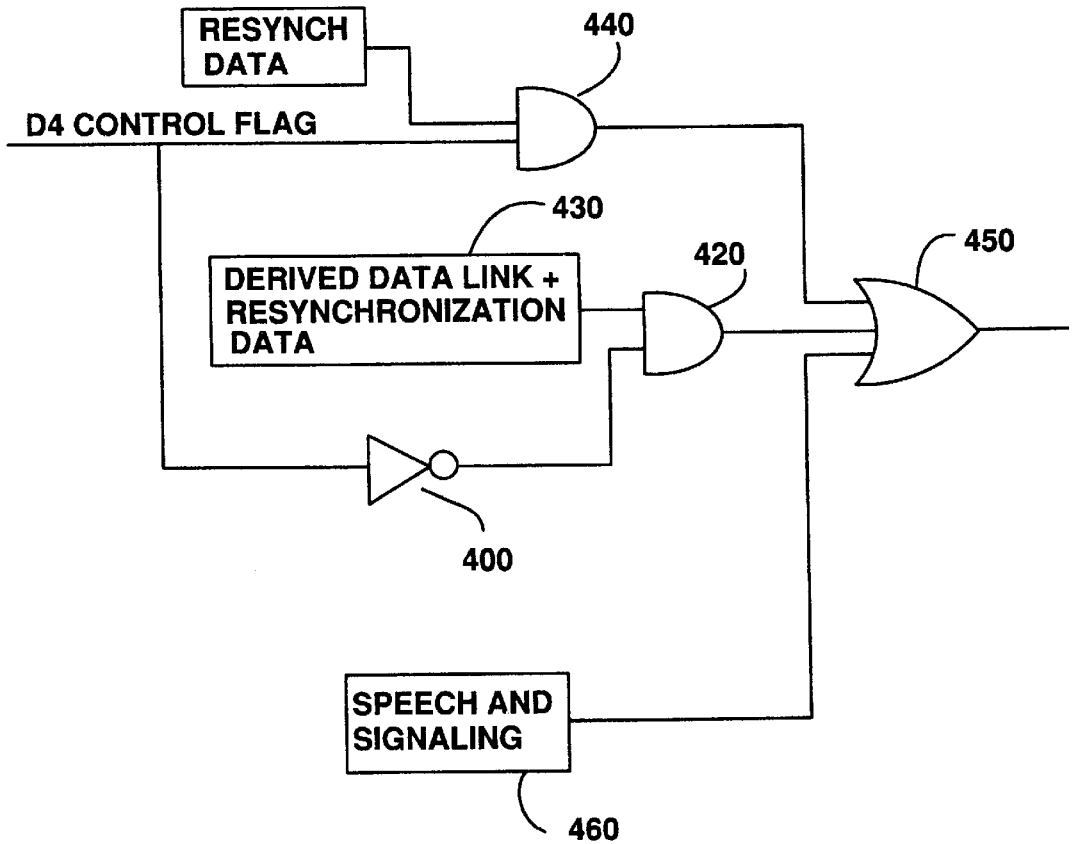
FIG. 10 is a logical diagram illustrating the conversion process performed by a conversion module within the TR-8 interface module for connecting to a D4 channel bank.

Accordingly, a flag variable is set instructing the conversion module to filter and replace the derived data link data if the A-link is connected to a D4 channel bank. In accordance with the teachings of the present invention, reference is now made to FIG. 10 illustrating a logical diagram for filtering and replacing the derived data link data when the TR-8 interface module is is connected to a D4 channel bank via the A-link. In case the TR-8 interface module is connected to a D4 channel bank, the flag variable 410 is set to true (1). If not, the flag variable 410 is set to false (0). The value of the flag variable 410 is inverted by an inverter 400. The inverted flag variable value is then logically "ANDed" with the re-synchronization and derived data link data via an AND gate 420. Accordingly, if the D4 control flag variable is set to true (1), the value of zero will be ANDed with the derived data link data to delete the unexpected data. On the other hand, if the D4 control flag variable is set to false (0), the value of one will be ANDed with the derived data link data to transmit the unmodified derived-data-link data over the A-link. The original D4 control flag value is also ANDed with the re-synchronization data via another AND gate 440 (the first twenty four bits from the first two super frames within a full set of re-synchronization and derived data link data) If the D4 control flag is set to true, unmodified re-synchronization data will be used by the OR gate 450 to replace the derived data link data portion that was previously deleted by the AND gate 420. The OR gate 450 further combines the re-synchronization data with the speech and. signaling data and transmits them over the A-link. For incoming data received from the D4 channel bank, similar logical procedures but in reverse order are performed by the conversion module.

Figure 11:
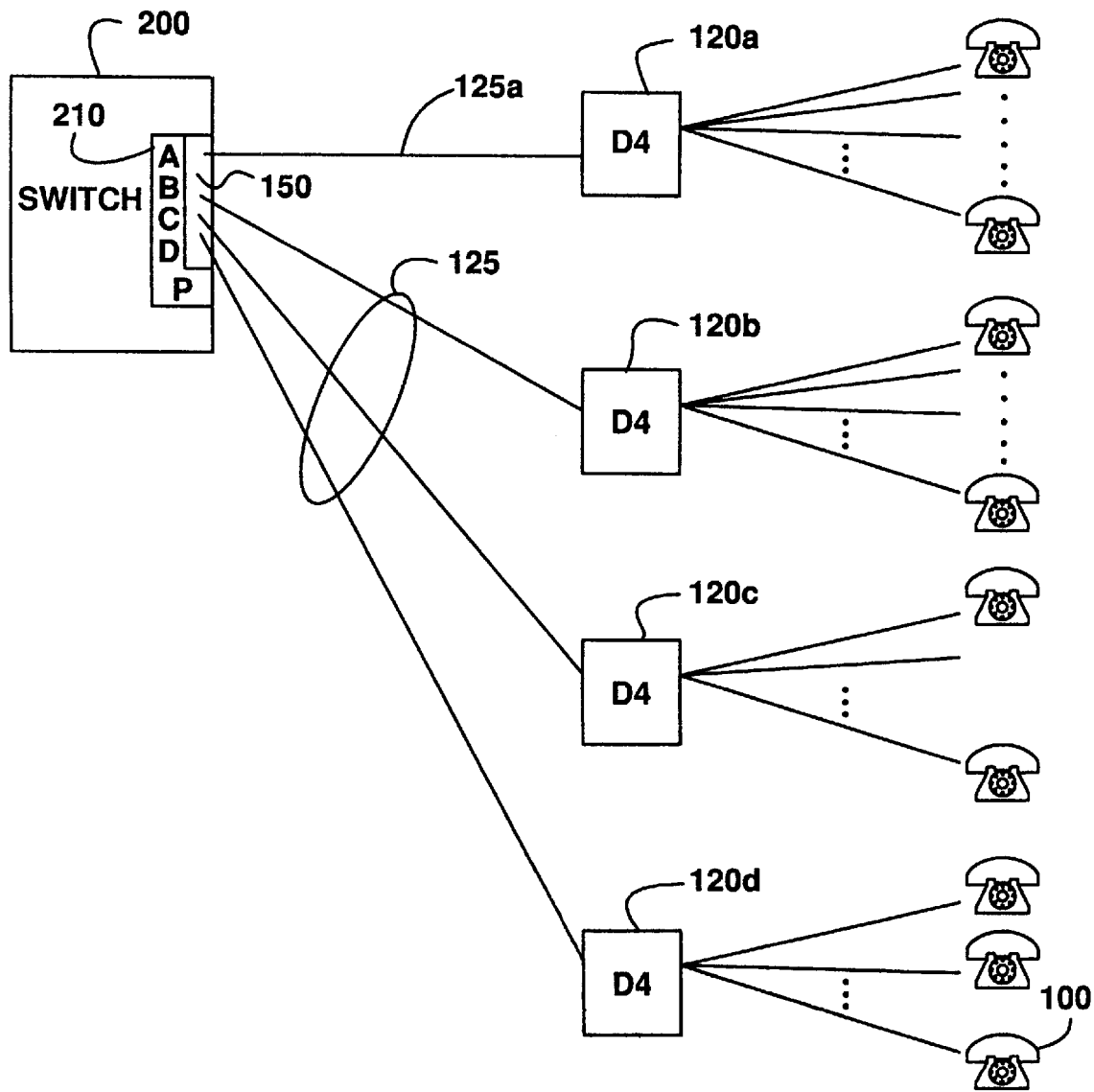
FIG. 11 is a diagram illustrating a TR-8 interface module within a telecommunications exchange interfacing with multiple D4 channel banks.

FIG. 11 is a diagram illustrating the TR-8 interface module 210 within a telecommunications exchange 200 interfacing with multiple D4 channel banks 120a, 120b, 120c, and 120d located in different geographical areas. Because a single D4 channel bank 120 only utilizes one of the above four data links (A, B, C, or D link) afforded by the TR-8 interface module 210, additional D4 channel banks located on different customer premises can be connected to the same TR-8 interface module 210 for further utilization. Accordingly, Each of the four communications links (A, B, C, or D link) in the TR-8 interface module 210 is individually connected to the four D4s via four separate T-1 lines 125 as shown in FIG. 11. Again, the conversion module 150 is used to convert the communicated A-B bit patterns and time slots between the D4 channel banks 120 and the TR-8 interface module 210 to be compatible with each other. Furthermore, for the D4 channel bank 120a connected to the TR-8 interface module 210 via the A-link 125a, the conversion module 150 further has to filter and replace maintenance data from the data communicated with the D4 channel bank 120a as described above.

As a result, even though only 24 line capacity is utilized at each customer location, up to 96 line capacity in the telecommunications exchange side can be utilized using four separately located D4 channel banks. Therefore, in accordance with the teachings of the present invention, maximum customer line utilization is achieved without sacrificing or under-utilizing any telecommunications exchange capability.

Figure 12:
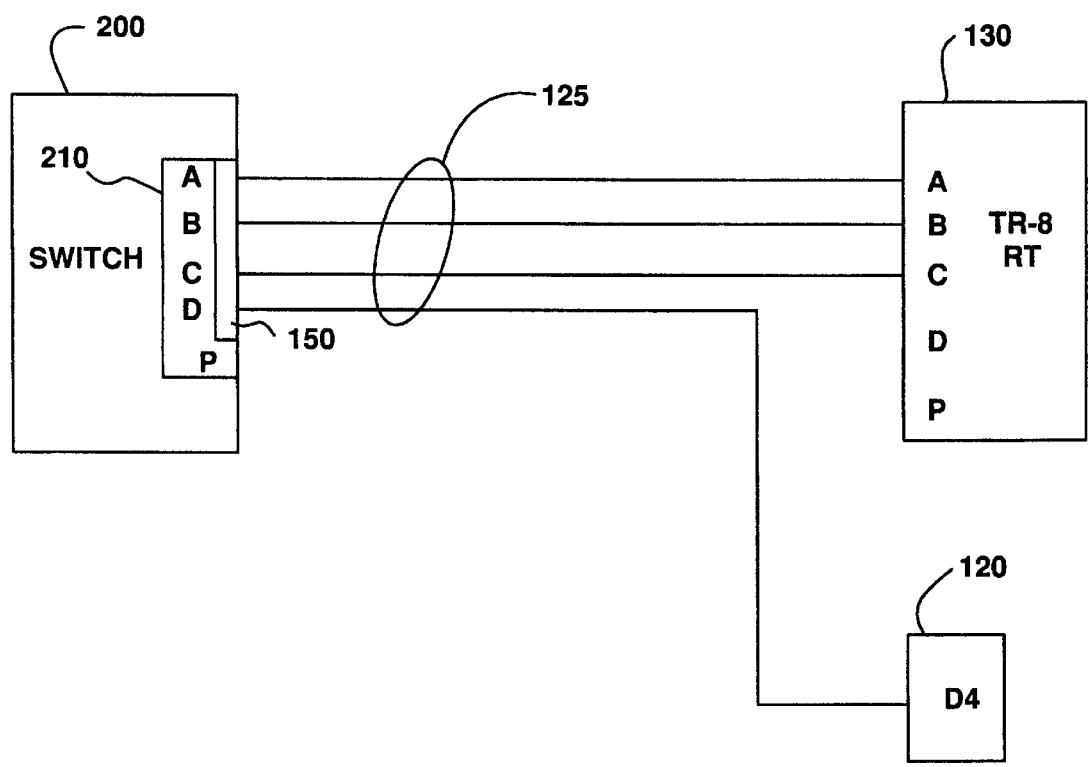
FIG. 12 is a diagram illustrating a TR-8 interface module within a servicing telecommunications exchange interfacing with both a D4 channel bank and a TR-8 RT.

Furthermore, a single TR-8 interface module 210 within a telecommunications exchange 200 can be connected to both the TR-8 RT 130 and the D4 channel bank 120. Accordingly, FIG. 12 is a diagram illustrating a TR-8 interface module 210 within a servicing telecommunications switch 200 interfacing with both the D4 channel bank 120 and the TR-8 RT 130. If a particular customer requires only 72 subscriber line capacity, the TR-8 RT 130 is installed for that customer with only three of the above four communications links connected between the TR-8 RT 130 and the TR-8 interface module 210. Accordingly, the A, B, and C links within the TR-8 interface module 210 are used to connect to the A, B, and C links within the TR-8 RT 130. In order to further maximize the TR-8 interface module 210, the unconnected D link within the TR-8 interface module 210 is used to connect to the D4 channel bank 120 located in a different geographic area. The conversion module 150 intercepts all signals received from both the TR-8 RT 130 and the D4 channel bank 120. If the intercepted signals are from the TR-8 RT 130, the signals are transferred to the TR-8 interface module 210 transparently. However, if the signals are from the D4 channel bank 120, the conversion steps described above for the A-B bit patterns and the time slots are executed.

Accordingly, a D4 channel bank is used to service additional 24 subscriber lines that would have required an additional TR-8 interface module if the TR-8 RT 130 used all four links to connect to the TR-8 interface module 210. If the TR-8 RT customer later requires additional 24 line capacity, the existing D link can easily be disconnected between the TR-8 interface module 210 and the D4 channel bank 120, and can be used to connect to the TR-8 RT 130 for additional line capacity. The D4 channel bank 120 can also be reconnected to another TR-8 interface module within the same telecommunications exchange 200.

By substituting under-utilized TR-8 RTs with less expensive D4 channel banks, telecommunications service providers can better provide line service to sparsely populated customers more economically and efficiently.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for connecting a plurality of telecommunications subscriber terminals to a telecommunications exchange, said system comprising:

a channel bank connected to said plurality of telecommunications subscriber terminals;

a remote terminal interface module within said telecommunications exchange, said remote terminal interface module further comprising an A-link interface part the remote terminal interface module generating a signal comprising channel data and framing bits for transmission over the A-link interface part, said framing bits comprising a re-synchronization data portion and an A-link derived-data-link data portion;

a T-1 communications link connecting said channel bank with said A-link interface part of said remote terminal interface module; and a conversion module at the telecommunications exchange connecting said remote terminal interface module to the T-1 communications link for removing said A-link interface derived-data-link data portion from said signal being transmitted from said remote terminal interface module towards said channel bank over the T-1 communications link.

2. The system of claim 1 wherein said remote terminal interface module comprises an Extension Switch Module (ESM).

3. The system of claim 1 wherein said channel bank comprises a D4 channel bank.

4. The system of claim 1 wherein said conversion module for removing, from said signal, said A-link interface derived-data-link data portion replaces said A-link interface derived-data-link data portion being transmitted with the re-synchronization data portion.

5. The system of claim 1, wherein said A-link derived-data-link data portion further comprises A-link derived-data-link maintenance data.

6. The system of claim 1, wherein said conversion module for removing, from said signal, said A-link interface derived-data-link data portion suppresses the A-link derived-data-link data portion.

7. A method of connecting a plurality of telecommunications subscriber terminals to a telecommunications exchange including a remote terminal interface module, said remote terminal interface module generating a signal comprising channel data and framing bits for transmission over the A-link interface part, said framing bits comprising a re-synchronization data portion and an A-link derived-data-link data portion, said method comprising the steps of:

connecting said plurality of subscriber terminals to a channel bank;

connecting said channel bank to one end of a T-1 communications link;

connecting the other end of a T-1 communications link to a conversion module for an A-link interface part of said remote terminal interface module; and removing at the other end of the T-1 communications link by the conversion module of said A-link interface derived-data-link data portion from said signal being transmitted from said remote terminal interface module towards said channel bank over said T-1 communications link.

8. The method of claim 7 wherein said channel bank comprises a D4 channel bank.

9. The method of claim 7 wherein said step of removing, from said signal, said A-link interface derived-data-link data portion further comprises the step of replacing said A-link interface derived-data-link data portion with the re-synchronization data portion.

10. The method of claim 7 wherein said remote terminal interface module comprises an Extension Switch Module (ESM).

11. The method of claim 7, wherein said step of removing, from said signal, said A-link derived-data-link data portion further comprises the step of removing A-link derived-data-link maintenance data.

12. The method of claim 7, wherein said step of removing, from said signal, said A-link interface derived-data-link data portion further comprises the step of suppressing the A-link derived-data-link data portion.

13. A system for connecting a plurality of telecommunications subscriber terminals to a telecommunications exchange including a remote terminal interface module, said remote terminal interface module generating a signal comprising channel data and framing bits for transmission over the A-link interface part, said framing bits comprising a re-synchronization data portion and an A-link derived-data-link data portion, said system comprising:

means for connecting said plurality of subscriber terminals to a channel bank;

means for connecting said channel bank to one end of a T-1 communications link;

means for connecting the other end of a T-1 communications link to a conversion module for an A-link interface part of said remote terminal interface module; and means for removing at the other end of the T-1 communications link by the conversion module of said A-link interface derived-data-link data portion from said signal being transmitted from said remote terminal interface module towards said channel bank over said T-1 communication link.

14. The system of claim 13 wherein said channel bank comprises a D4 channel bank.

15. The system of claim 13 wherein said remote terminal interface module comprises an Extension Switch Module (ESM).

16. The system of claim 13 wherein said means for removing, from said signal, said A-link interface derived-data-link data portion further comprises means for replacing said A-link interface derived-data-link data portion with the re-synchronization data portion.

17. The system of claim 13, wherein said means for removing, from said signal, said A-link derived-data-link data further comprises means for removing A-link derived-data-link maintenance data.

18. The system of claim 13, wherein said means for removing, from said signal, said A-link derived-data-link data portion further comprises means for suppressing said A-link derived-data-link data portion.

19. A method for communicating voice and signaling data from a channel bank to a remote terminal interface module within a telecommunications exchange over a T-1 communication link, said remote terminal interface module generating a signal comprising channel data and framing bits for transmission over the A-link interface part, said framing bits comprising a re-synchronization data portion and an A-link derived-data-link data portion, said method comprising the steps of:

determining whether or not said T-1 communications link connects A-link interface part of said remote terminal interface module to said channel bank; and in response to an affirmative determination, removing at said remote terminal interface module by a conversion module said A-link derived-data-link data portion from said signal being transmitted from said remote terminal interface module towards said channel bank.

20. The method of claim 19 wherein said step of determining further comprises the step of evaluating a flag variable indicating whether or not said A-link interface part is connected to said channel bank.

21. The method of claim 19 wherein said step of removing, from said signal, said A-link derived-data-link data portion further comprises the step of replacing said A-link interface derived-data-link data portion with the re-synchronization data portion.

22. The method of claim 19 wherein said channel bank comprises a D4 channel bank.

23. The method of claim 19, wherein said step of removing, from said signal, said A-link derived-data-link data further comprises the step of removing A-link derived-data-link maintenance data.

24. The method of claim 19, wherein said step of removing, from said signal, said A-link derived-data-link data portion further comprises the step of suppressing said A-link derived-data-link data portion.

* * * * *